(12) United States Patent
Xie (10) Patent No.: US 7,665,843 B2
(45) Date of Patent: Feb. 23, 2010

(54) METHOD AND THE ASSOCIATE MECHANISM FOR STORED-IMAGE DATABASE-DRIVEN SPECTACLE FRAME FITTING SERVICES OVER PUBLIC NETWORK

(76) Inventor: Yiling Xie, 900 Arcadia Ave., #8, Arcadia, CA (US) 91007

( * ) Notice: Subject to any disclaimer, the term of this patent is extended or adjusted under 35 U.S.C. 154(b) by 290 days.

(21) Appl. No.: 11/677,144

(22) Filed: Feb. 21, 2007

(65) Prior Publication Data

US 2008/0201329 A1    Aug. 21, 2008

(51) Int. Cl.
*A61B 3/00* (2006.01)
*A61B 3/04* (2006.01)
*G02C 7/02* (2006.01)
(52) U.S. Cl. .................. 351/200; 351/227; 351/177
(58) Field of Classification Search .............. 351/41, 351/177, 200, 204–205, 227, 244, 246; 702/1, 702/5, 150–153; 703/1–2, 6; 705/26–27, 705/158
See application file for complete search history.

(56) References Cited

U.S. PATENT DOCUMENTS 6,535,223 B1 *  3/2003  Foley .................. 345/629
6,583,792 B1 *  6/2003  Agnew ................ 345/660

* cited by examiner

Primary Examiner—Scott J Sugarman
Assistant Examiner—Dawayne A Pinkney
(74) Attorney, Agent, or Firm—Jen-Feng Lee, Esq.

(57) ABSTRACT

A method of spectacle frame fitting over public network, such as Internet, based upon database of product information and digitized user images as acquired via devices connected to computer. Particularly, consumers can take advantage of present method to choose spectacle frames from wide variety of selections, expeditiously by the use of public computer network (Internet). Consumers may use digital cameras, network cameras or scanned photos to submit facial image, and by way of calibration steps such as the gap between two pupils aligned to the marked pupil point of the stored spectacle images, the suitable size of the spectacle frame can then be determined for best fit to the facial image. With the accessibility and availability of the Internet, just a few clicks on the mouse enable the consumers to choose spectacle frames of their preference and in a way that affords wide selections at low costs and easy access.

11 Claims, 10 Drawing Sheets

METHOD AND THE ASSOCIATE MECHANISM FOR STORED-IMAGE DATABASE-DRIVEN SPECTACLE FRAME FITTING SERVICES OVER PUBLIC NETWORK

FIELD OF THE INVENTION

The present invention relates generally to a method of spectacle frame fitting over public network, such as the Internet, based upon database of product information and digitized user images as acquired via devices connected to computers. Particularly, consumers can take advantage of present method to choose spectacle frames from wide variety of selections, expeditiously by the use of public computer network (Internet). With the accessibility and near universal availability of the Internet, just a few clicks on the mouse enable the consumers to choose spectacle frames of their preference and in a way that affords wide selections at low costs and easy access and promote the efficiency in the spectacle fitting process.

BACKGROUND AND PRIOR ART

People wearing glasses or spectacle frames prefer to try on different styles of frames. Before making purchases, test-fitting spectacle frames includes checking out the availability and styles of frames on the market, to see what would fit nicely with the facial features of a person wearing glasses/frame. In any given store where a consumer visits, only limited amount of frames can be made available to people who come in to test fit. As a result, a consumer will not have the chance to test fit some styles that are not in the stores visited.

A store, on the other hand, may lose a sale simply because it is not able to provide the opportunity for the consumer to test fit certain style or model of frames that are best suited for a consumer and is otherwise available elsewhere.

The recent development of Internet and its universal accessibility due to the popularity of personal computers in everyday households, and other sites of connectivity such as Internet Café, enable the huge growth in Internet commerce, so-called e-commerce. A huge portion of the e-commerce today actually involves the selling of lens and spectacle frames for lenses of different purposes. However, despite the accessibility of such spectacle frames over the Internet, there has not been a viable Internet test-fitting system and method for consumers to try on the wide variety of different styles to fit facial features and other individual preference before making the purchase.

Although programmers can put together software programs that can fit a facial image to a spectacle frame image, there is no functional feature to change or scale the size of the spectacle images, relative to that of a face.

Present invention differs and improves over prior art Fay U.S. Pat. No. 5,983,201 (Fay 201) in that consumers, according to Fay 201, need to have their frames fitted in a remote electronic store (RES). All the limitations associated with RES are not present in present invention, including the travel to and from consumers' place to RES and the diagnostic procedures and restrictions employed by RES.

Additionally, opticians suggest regular check-ups for eyesight, and the consequential fitting of updated prescription and frames also entails more inconvenience associated with RES as stated in Fay 201.

U.S. Pat. No. 6,791,584, issued to the same inventor of present application, is disclosed to resolve the problem associated with fitting computer-stored images of spectacle frames to scalable human faces, making it easier to fit frames to faces via the use of stored images in computers. Said patent involves the major steps below:

(a) Provide the image of a spectacle frame (without the frame legs) to the memory of a computer, and determine the mid point of the two lenses as existed on the spectacle frames;

(b) Determine the display ratio of the frame, based upon the real size information of the frame being shown on the computer display;

(c) Input the front image of a consumer and display the facial image on the computer;

(d) Provide a pair of marking points on the computer monitor corresponding to those of human pupils;

(e) Use regular input devices, such as a computer mouse, to move said pair of marking points towards the mid point of the two lenses until their coincide; measure the distance between the two pupils on the facial image and record said distance into computer, as the pupil distance for computer stored facial image;

(f) Enter the real pupil distance as measured on the consumer's face into computer; determine the ratio of the distance as between the two pupils on the facial image and the real distance on the consumer's face;

(g) Adjust the relative size of facial image to the size of the spectacle frame, so that the facial image and spectacle frame image will be shown on the computer display unit according to the proper scale;

(h) Operate the computer to superimpose the spectacle frame image on the facial image and make adjustment until the mid point of the two pupils on the facial image overlaps with the mid point of the two lenses on the spectacle frame.

Note that in steps (a) and (b), various sizes and shapes of spectacle frames have been pre-loaded into computer databases, having their images stored in electronic memory devices of a computer for access.

SUMMARY AND OBJECT OF THE INVENTION

Present invention builds upon applicant's prior technological disclosure, to implement a database-driven stored-image spectacle frame fitting method, enabling consumers to make purchase decisions of spectacle frames and products over the public Internet by selectively "trying on" different spectacle frames on the facial image, saving the trouble of actually fitting on real spectacle frames by visiting multiple stores.

To achieve the goal stated above, the database-driven stored-image spectacle frame fitting method involves the following steps:

(a) Produce the frontal view of spectacle frames having open frame legs and derive the digital image of said frontal view after the background and the optical lenses are made transparent; and, (b) Enter the size parameters and other relevant attributes of said digital images when they are stored into computer databases.

(c) Set up a calibration paste-over device containing a benchmark ruler on the display device so that there are two marking points on the bench mark ruler that can be used as the alignment/matching reference points relative to facial images when displayed.

The benchmark ruler can be moved, dragged, expanded and contracted, relative to the facial image, so that the marking points can be set to superimposed upon selected marking points (such as centers of pupils) on facial images, resulting in the correct size calculation of facial image relative to the stored images of the spectacle frames, based upon the attributes of height and width of spectacle frames that have been pre-loaded into database.

Said benchmark ruler additionally contains a crop-box on either horizontal side of said ruler, for purpose of cropping away ear portion on a facial image. This is detailed later.

A further treatment, as disclosed and claimed in present invention, is to add crescent-shaped reflective color effect (available in popular photo/graphics software applications and programs) to the opposite and corresponding spots on the two lenses, or the area on the spectacle frame defining two lenses. Coupled with the treatment of fading (color or gray level) processing, the reflective color effect is made more life-like. The lower portion or the underside of the spectacle frame image can also be superimposed with shade-lines and shades of gray, to enhance the effect of color fading. Additionally, the image of the spectacle frame and the area containing lenses on the spectacle frame and the background, after having been made transparent, can be made to have a layered ontextual view for consumers.

The size parameters and other relevant attributes of said digital images for storing into computer databases images, as stated herein, include the spectacle frame's width, height, and the mid points of the vertical and horizontal lines in the measurement.

To achieve the goal stated above, present invention further disclosed a spectacle frame fitting mechanism for choosing optical products over the public network. Such mechanism is made up of:

A choice center containing a computer database stored with images of spectacle frames, so that the display outlets of said computer database can be accessed via the use of public network, such as Internet, wherein the images of spectacle frame may be viewed and selected for manipulation by users for spectacle frame fitting purpose. Each of the digital image of spectacle frame will be obtained by the process described below:

Produce the frontal view of spectacle frames having open frame legs and derive the digital image of said frontal view after the background and the optical lenses are made transparent; Enter the size parameters and other relevant attributes of said digital images when they are stored into computer databases;

Set up a transmission platform containing display device that is connected to above said computer database via communication protocol, wherein users may transmit facial images from said platform and have the images shown on the display device over the public network from any point of connectivity;

Set up a calibration paste-over device, so that said paste-over device produce a benchmark ruler which contains two marking points that can be used as the alignment/matching reference points relative to facial images when displayed.

The ratio of frame size to facial image size is then used by subsequent paste-over device to put all other spectacle frames as chosen by consumers to "try on" to the facial images, allowing consumers to see if he/she likes the simulated "looks" of "wearing" the selected spectacle frames, after the computer has correctly set the size ratio of all other spectacle frame images, due to the benchmark superimposition process described hereinabove.

Preferably, the marking points on the facial images are the centers of pupils. The distance of the two pupil marking points may be obtained at time of optician measurement; users may also obtain the distance figure by self-measuring. Alternatively, a ruler may be used in a facial image acquisition process, by placing a vertical/horizontal ruler alongside a user's face. Marking points can also be the pair of points defining the two sides of a person's mouth; they can also be the points defining the vertical distance between eyes and nose.

Similarly, a vertical/horizontal ruler may be placed alongside a user's face when obtaining the distance of marking points other than the two pupils.

Marking points can also be the spectacle frame already worn on a user's face, especially in the case where the user is choosing to purchase a shelter frame to wear over the optical spectacle frames (near-sightedness or far-sightedness). The measurement of marking points based upon a person already wearing optical spectacle lenses is straightforward and does not require further disclosure herein.

The database-driven stored-image spectacle frame fitting method and device as described herein allows users to take advantage of digital cameras, web cam and/or scanners, via the easiness of public network such as Internet, and to have the opportunity of seeing own looks of how well some chosen spectacle frames of different styles/colors would fit on one's own face.

Following the calibration steps described herein, the ratio of spectacle frame size to the facial image size can be determined by the alignment/superimposition of marking points on the benchmark ruler and those of the facial image. The automatic process of applying the same ratio to all other chosen spectacle frame images, by the simple operation of moving and dragging computer mouse and cursor on display device as stated herein, reduces the user trouble of physical travel to optician's office, traditional retail store, or the RES in Fay 201, and the fitting process is made more painless and efficient.

Present invention provides a cost-effective solution to the spectacle frame try-on and purchase process, by the use of computer database and the publicly available Internet and also may be used by optical industry as auxiliary infrastructure for research and promoting better consumer optical products.

BRIEF DESCRIPTION OF THE DRAWINGS

The accompanying drawings, which are incorporated in and constitute a part of this specification, illustrate the preferred embodiment of the invention and together with the description, serve to explain the principles of the invention. A brief description of the drawings is as follows.

DETAILED DESCRIPTION OF THE PREFERRED EMBODIMENT

Figure 1:
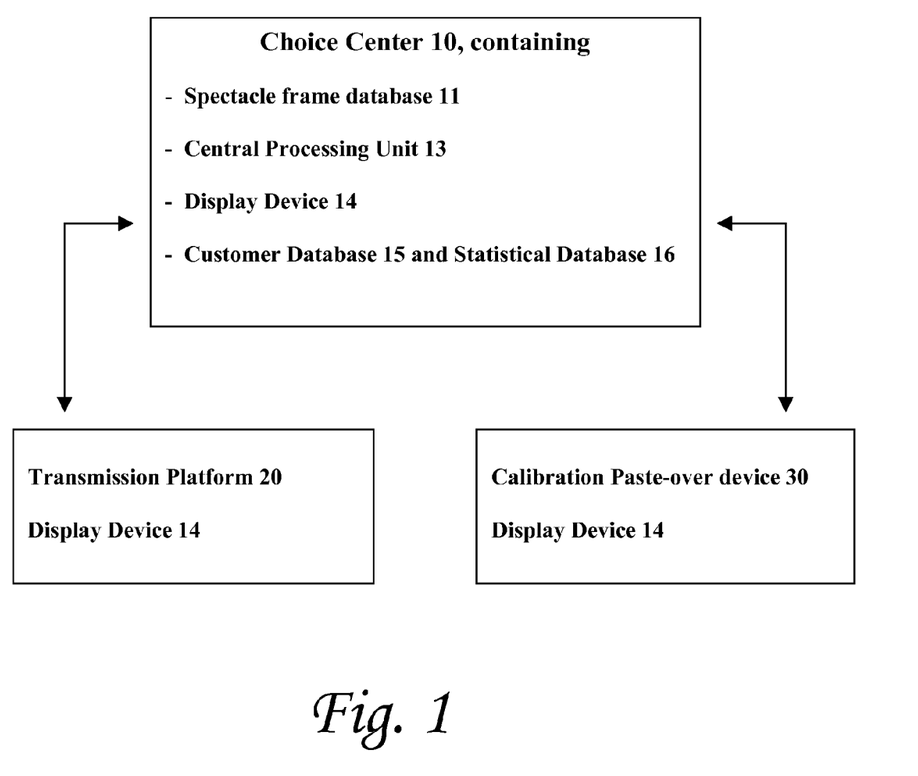
FIG. 1 shows a first block diagram for system architecture of a spectacle frame fitting method in accordance with the disclosure of present invention.

As shown by all the figures, and specifically in FIG. 1, the ideal implementation spectacle frame fitting method and mechanism over the public network, Internet, is composed of a Choice Center 10, a transmission platform 20 and a calibration paste-over device 30. Choice Center 10 includes a spectacle frame database 11, central processing unit (CPU) 13 and a display device 14.

In spectacle frame database 11, different attributes can be pre-set by classifications of manufacturers, brands, genders, materials, shape of frame, colors and varieties of functions. Said database 11 is configured as suitable for access via public network, such as Internet, so that a huge selection of digital frame images 12 are available for consumer to choose for fitting. Said selection of digital frame images 12 contain the real size and ratio figures of all the stored spectacle frames.

Figure 3:
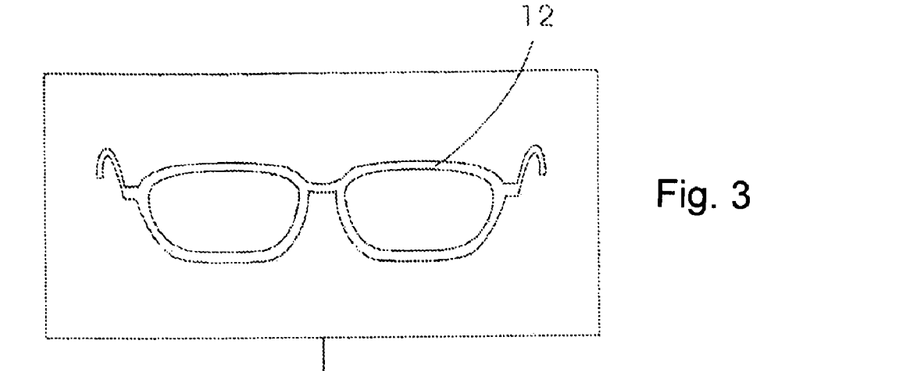
FIG. 3 shows the first step of producing the frontal digital image of a spectacle frame for storing into computer database in accordance with the disclosure of present invention.

The image for each and every digital image of the spectacle frame is produced in the following manner:

Produce the frontal view of spectacle frames having fully open frame legs, as present invention prefers the fully open frame legs that would show the curved portion of the legs. This can be done by a digital camera, a scanner serving as the image in-take device, or any other image acquiring hardware, such as a normal optical camera, which would entail further scanning and digitization.

The background and the area on the spectacle frame containing optical lenses are then made transparent, by the use of commercially available photo or graphics software such as PhotoShop. The transparentization treatment includes making the image of the spectacle frame to appear more like 3-D image in simulation. This can be readily done by many photo-touch-up or graphics software that normally perform shifting or position translation on the edge or border, and then perform gray level, brightness and/or color adjustment. Additionally, the crescent-line-shaped reflective color effect to the opposite and corresponding spots on the two lenses, or the area on the spectacle frame defining two lenses, is used along with the color-fading treatment, to simulate the light-reflection as experienced around optical objection in real life. The color-fading treatment is also called blurry effect treatment, as the image and graphics treatment technique commonly used in PhotoShop, which is a form of mean-value treatment algorithm in computer terminology. The lower portion or the under surface of a spectacle frame can have shaded lines pasted on, also to achieve the color-fading effect and to make the shadeness look more lifelike.

Figure 4:
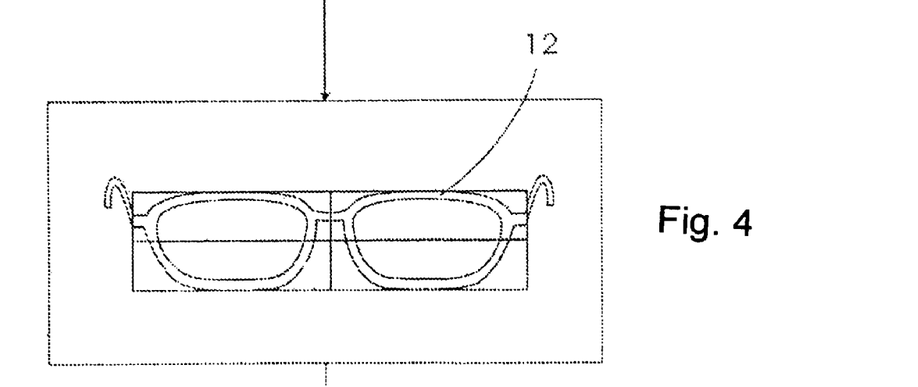
FIG. 4 shows the second step of producing the frontal digital image of a spectacle frame for storing into computer database in accordance with the disclosure of present invention.
Figure 5:
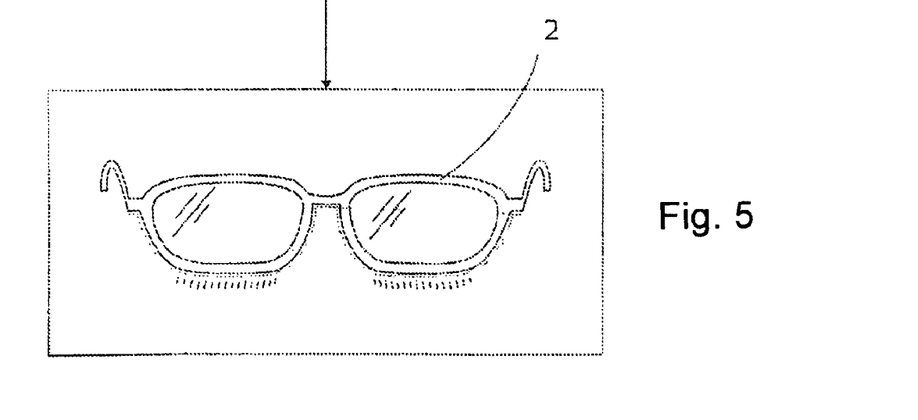
FIG. 5 shows the third step of producing the frontal digital image of a spectacle frame for storing into computer database in accordance with the disclosure of present invention.
Figure 6:
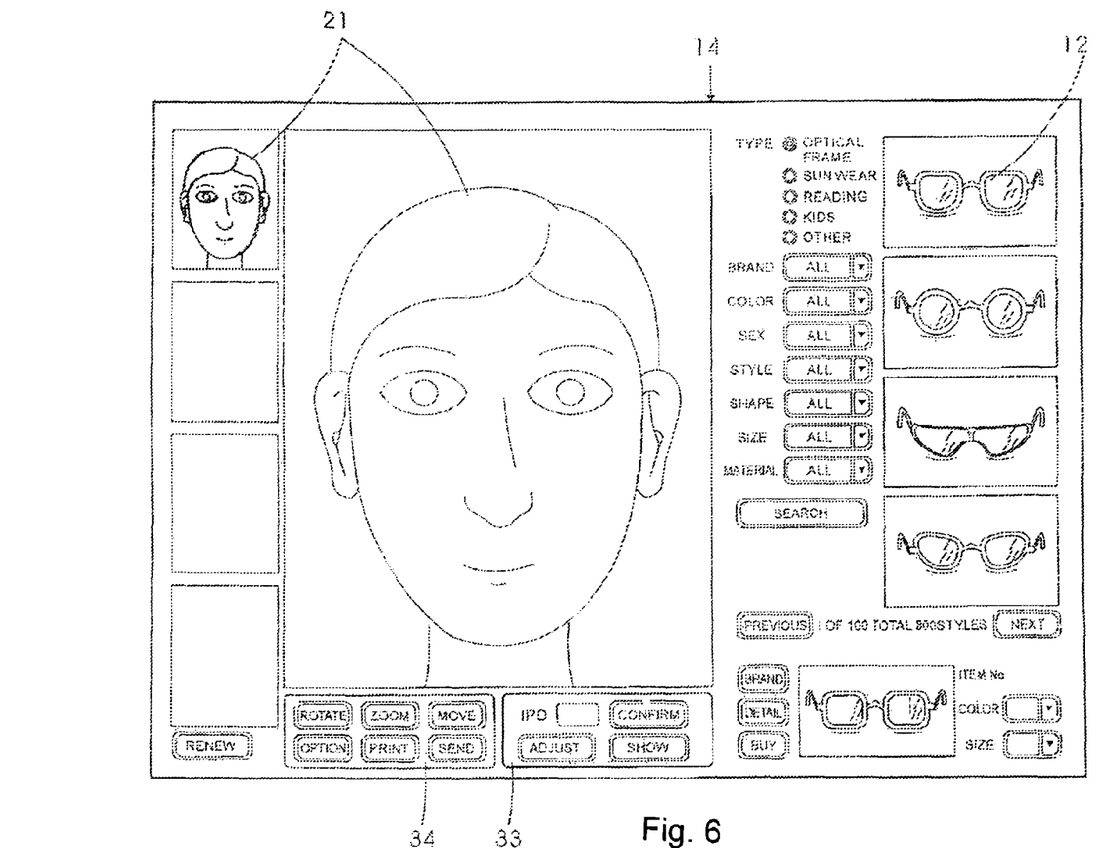
FIG. 6 shows the user facial image without paste-over device when the spectacle frame fitting mechanism is used in accordance with the disclosure of present invention.

When the digital images of the spectacle frames, as treated by the steps stated above, are stored into the computer database 12, various attributes are also stored, including the horizontal mid point between the spectacle frames, and the real size, enabling the stored images to have the proper size ratio relative to the real spectacle frame. The horizontal and vertical mid points of the spectacle frame, expressed in its real world size measurement, are also stored into the database as the attributes pertaining to the image; as is depicted in FIG. 4 where the measurements of horizontal and vertical lines and mid points are indicated.

Although the depictions contained in present application show the traditional spectacle frames wherein optical glass pieces are fully surrounded by the frame, the disclosure herein, related to scanning and measurement taking also apply to the newer type of spectacle frames where the glass pieces are only half-surrounded or secured to the frame by a few screws or other means without the surrounding frame materials.

The frontal images of spectacle frames to be fitted on to a consumer's face, after the treatment stated above, will appear to have more real-life effect, greatly enhancing the buying experience as consumers look at how the spectacle frames are fitted to their face.

Transmission platform 20 is suitable for use when users transmit their image 21 via the display device 14 on said platform 20 over the public communication network. Alternatively, users can transmit their image 21 directly to the display device 14. Image 21 contains two pupils serving as basic benchmark points; calibration paste-over device 30 then aligns the two marking points on benchmark ruler 32 to the two pupils on image 21, and superimpose the image of the spectacle frame as selected by users on image 21, simulating the virtual look of a person wearing a spectacle frame on the face.

The two marking points are based on the same size ratio as users' marking points (two pupils) and the real distance between the two pupils 31. The distance of the two pupils 31 is used to calibrate the ratio for the stored image of spectacle frames to be put on user's face 21 and to insure that the image of the spectacle frame is properly sized to fit the size of a user's face.

In accordance with the disclosure of present invention, calibration paste-over device 30 preferably has a moveable vertical plumb line 321, serving as the vertical baseline on display device 14 separating the two pupils 31 on the image of a user. Calibration paste-over device 30 further has a moveable horizontal measurement line 322, serving as the measurable ruler on the face of a user's image and also forming a cross-point with the vertical plumb line 321.

The benchmark ruler 32 in the calibration paste-over device 32 is made up of vertical plumb line 321 and horizontal measurement line 322, where the vertical plumb line 321 is aligned with the vertical marking points on user image 21 and the horizontal measurement line 322 is aligned with the horizontal marking points on user image 21. In actual usage, however, users need only choose to use either vertical plumb line 321 or horizontal measurement line 322 for marking, sizing and calibration purpose as stated in accordance with present invention.

Figure 7:
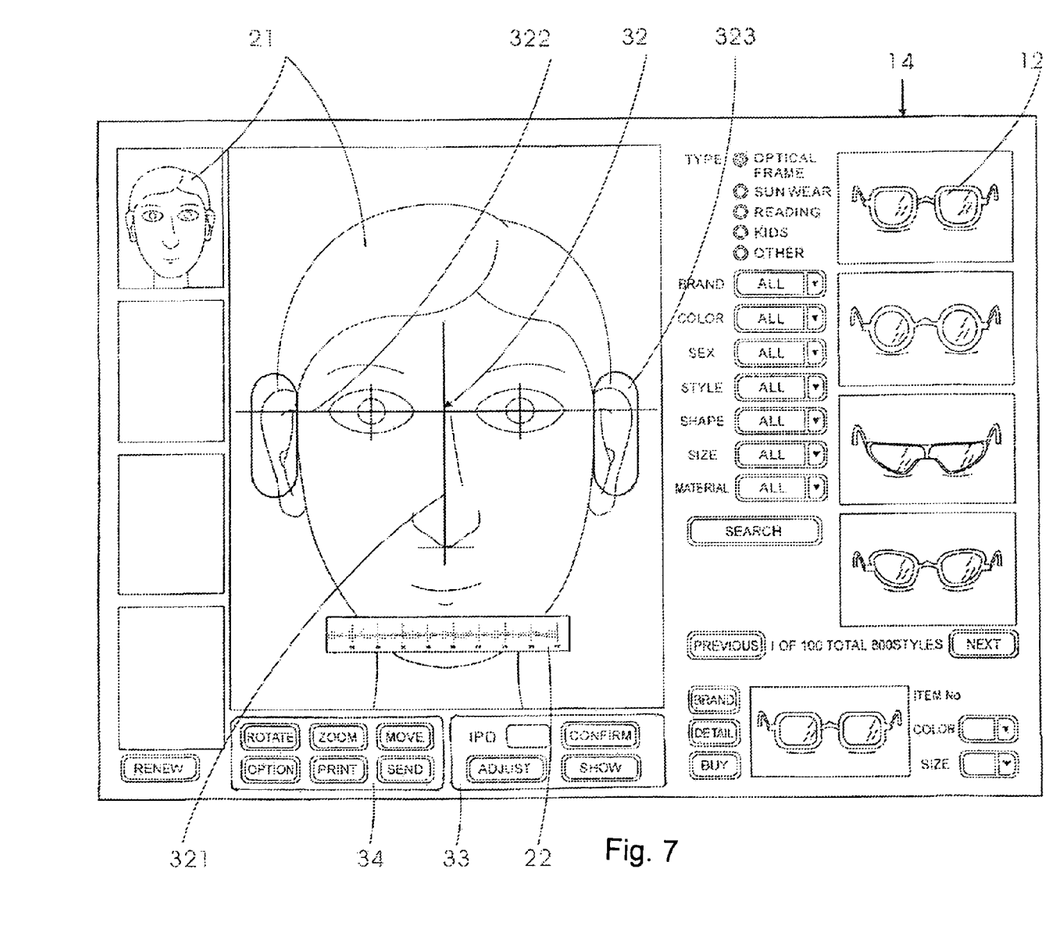
FIG. 7 shows the user facial image along with a ruler with length measurement marking and the benchmark ruler in accordance with the disclosure of present invention.

As shown in FIG. 7, the benchmark ruler 32 contains two cross-points made up by the vertical line 321 and horizontal line 322 when the cross-points are dragged to align with the two pupils 31 on the image 21. The distance between the two cross-points, as used by the treatment stated here, can be calculated, even if the figure is not pre-measured.

Calibration paste-over device 30 contains an operation window 33 for user to input the real distance between two pupils 31, to work with the benchmark ruler 32. Once the real distance between two pupils is entered, vertical and horizontal lines 322 and 321 can be used to align the cross-points to the two pupils and thus obtaining the size ratio of the face, which is then used by database 11 to adjust the displayed ratio of the stored images 12 for the spectacle frames, before the computer performs the superimposition of spectacle frames to the facial image of a user.

Therefore, the advantage of present invention allows the image of stored spectacle frames to remain fixed during the fitting process, whereas the user facial image 21, as shown on the display device 14 of the transmission platform 21, can be made larger or smaller, or rotation about certain axle, until the two marking points are aligned to the two pupils 31 of the user image 21.

Alternatively, the image 21 on the transmission platform 21 can be made to remain fixed during the fitting process, whereas the image 12 of the spectacle frame can be made larger or smaller, or rotation about certain axle, until the two marking points are aligned to the two pupils 31 of the user image; or until other selected marking points are aligned to the corresponding marking points on the user image.

As a preferred embodiment of present invention, display device 14 contains a benchmark ruler operation window 33 for setting the distance between two marking points. Other subwindows that would pop up to ask for display and adjustment of benchmark ruler are within the knowledge of people reasonably skilled in the computer programming field and is not stated here for reason of brevity.

Benchmark ruler 32 can have zoom in/out, shifting movement and rotational movement, to set and calculate distance of any select marked points based upon known points with known distance.

A separate zoom and control window 34 can be employed in display device 21, to allow for the enlargement or reduction of image. Alternatively, other sub-windows can be built to achieve the same purpose and is not stated herein for reason of brevity.

The calibration paste-over device 30 needs to have the real distance between pupils of a user; however, most people do not know this distance. To solve this minor inconvenience, a ruler can be used to be placed alongside the facial image of a user when acquiring the image of a user, for easy determination of any marking points, whether it be the case of two pupils or between the two sides of a person's mouth.

FIG. 7 shows such a solution where a ruler 22 is used, and the benchmark ruler 32 of the calibration paste-over device 30 comes with measurement markings, so that the image 21 can be enlarged or reduced, to have the same size ratio as the stored images of spectacle frames, based upon the same measurement of the ruler 22 and the benchmark ruler 32. The same size ratio adjustment is applicable to any two selected marking points, such as the two sides of a person's mouth.

Figure 8:
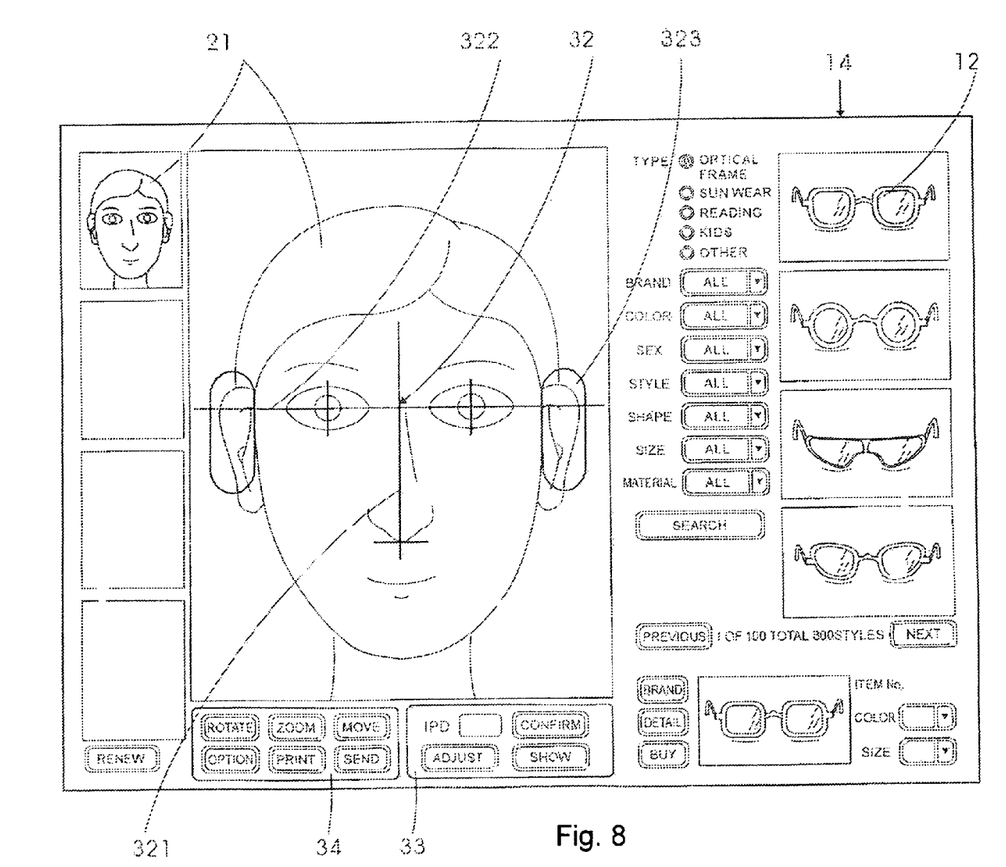
FIG. 8 shows the user facial image with the benchmark ruler for spectacle frame fitting mechanism in accordance with the disclosure of present invention.

Said benchmark ruler may additionally contain a crop-box on either horizontal side of said ruler, for purpose of cropping away ear portion on a facial image and pasting back, as shown in FIG. 8.

Even if a user does not provide the real size information re his/her pupil distance, the method of fitting spectacle frames to a user's face can still be done in a sort of virtual reality setting, in the case where an image of a user wearing spectacle frame is available. The benchmark ruler 32 of the calibration paste-over device 30 can be moved to overlay the user's facial image, so that the two outer edges of a spectacle frame image are aligned to the two outer edges of the spectacle frames as shown in a user image. A second user image, not wearing any spectacle frame, is transmitted to calibration paste-over device 30, so that the second image is aligned to the first image (with spectacle frame), an automated calculated size ratio can be obtained based upon the benchmark ruler 32.

A user's facial image, as acquired via scanner or other means, may include size parameter of the horizontal length and/or vertical height of a spectacle frame worn by the user, in the case where such user is near-sighted or far-sighted, wearing corrective optical spectacles and seeking to have a shelter frame, such as sun glasses. The system already has the correct size ratio to fit the shelter frame over the first (optical) spectacle frame and the frontal digital image of a shelter frame. Certainly, there is no need to be concerned about "fully open frame leg" when such type of shelter frame is being fitted.

In the case where users did not provide any real world size information, the database will build in, as the services are provided to more people, the user statistics for intelligently providing preferred attributes for consumer selection, based upon gender, age, ethnic group, etc. As initial setup, Choice Center 10 of present invention will divide products into senior, adult and children, based upon age. Also, the average pupil distance differs as among Europeans and Asians. Such statistics, as gradually set by users of present invention, will help provide more efficient use of this method of spectacle frame fitting as disclosed herein.

When user information is being entered, the attributes can further include height, weight, shape of face, for advanced indexing. Combining the attributes of gender, age, ethnic group, height, weight, the Choice Center 10 can then present a pre-selected subset of spectacle frames that are suited for the specific user.

After measuring and obtaining the distance between two pupil mark points, digital frame images 12 can then be selected to match facial image 21, simulating a consumer's actually test-fitting a spectacle frame in the traditional way. In the case where colors are an important aspect of test-fitting, such as when people are trying on a shelter frame as sunglasses over regular optical lenses, present invention envisions and allows the use of color-filling technique, as in the case of PhotoShop graphics tool, to add to the lenses area, showing the desired color for consumers to see the effect.

When spectacle frame database 11 starts to store the spectacle frame images 12, the frame body, frame legs, nose bridge and pads and lenses (the areas defining lenses) can be separately selected for use as part of digital frame images 12 used for displaying on the computer monitor as users may choose to see only that part over the facial image 21. As such, the CPU 13 is programmed to adjust or crop out some parts of digital frame image, responding to the desired effect stated herein.

This use is also beneficial for the research and development tool for coming up with new eye-wear or spectacle frames, since different parts of a spectacle frames can be selected for combination and showing on a display unit, and for observation and valuation on a simulated person (facial image).

The advantage of present invention is obvious in that consumers can view a huge selection of spectacle frames for the "try on" images of himself/herself, as long as the computer database 11 contain these digital images 12, even in the case where the optical lenses need medical prescription.

Figure 9:
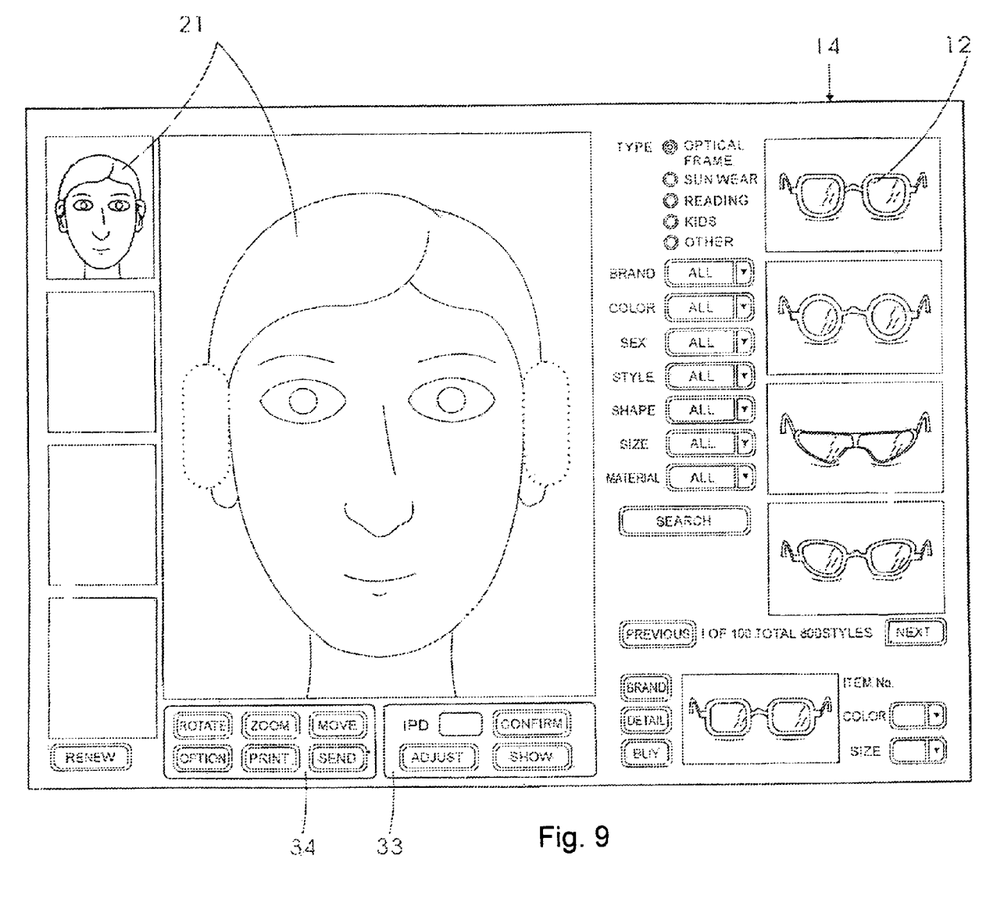
FIG. 9 shows the first step of pasting-over by cropping out the ear portion on the facial image, in accordance with the disclosure of present invention.
Figure 10:
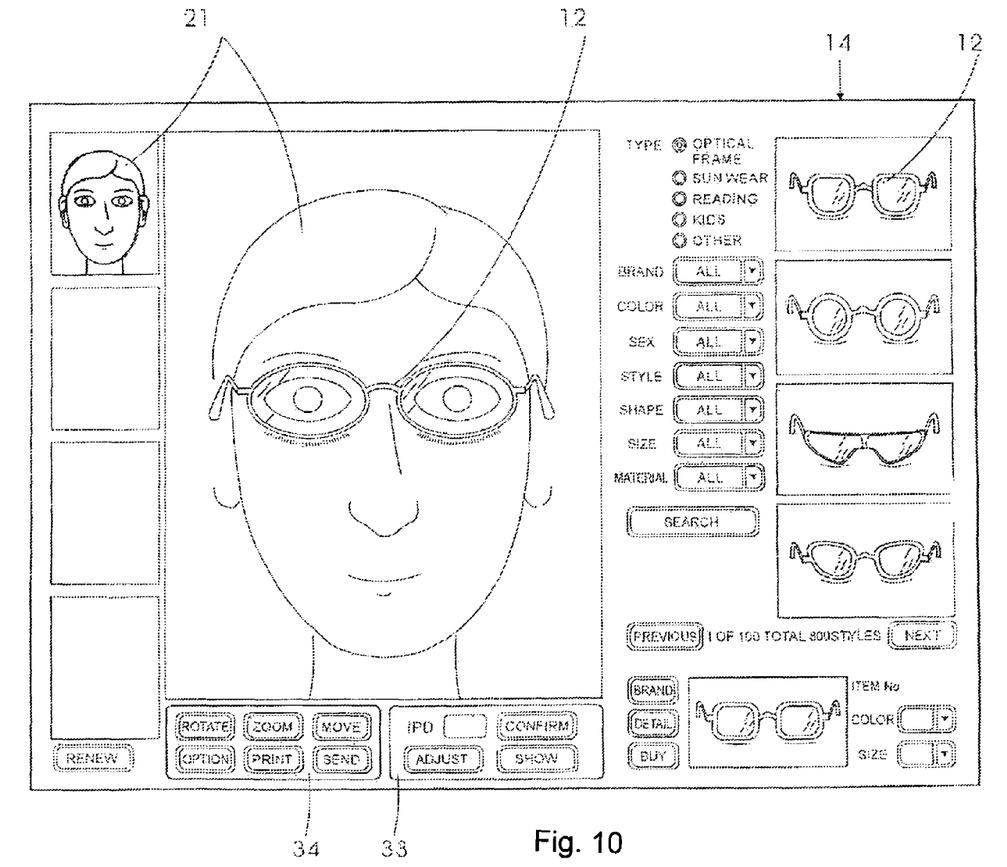
FIG. 10 shows the second step of pasting-over by superimposition of digital frame image over the facial image, in accordance with the disclosure of present invention.

The digital frame image 12 in the database 11, as shown in the Choice Center 10 contains spectacle frames having the legs fully opened. A crop-block 323, as used by Calibration paste-over device 30 on image 21 near the ear, may be in the shape of a rectangle, oval or crescent-moon. Said crop-block 323, when used on image 21, has a border crop-line that is set to mimic the border facial silhouette line abutting the ear portion, so that a consumer's ear portion on the image 21 can be cut out in the first step of paste-over according to the defined shape of said crop-block 323, and, in the second step, paste-over the digital frame image 12 over the face, including the cropped out ear portion.

Figure 11:
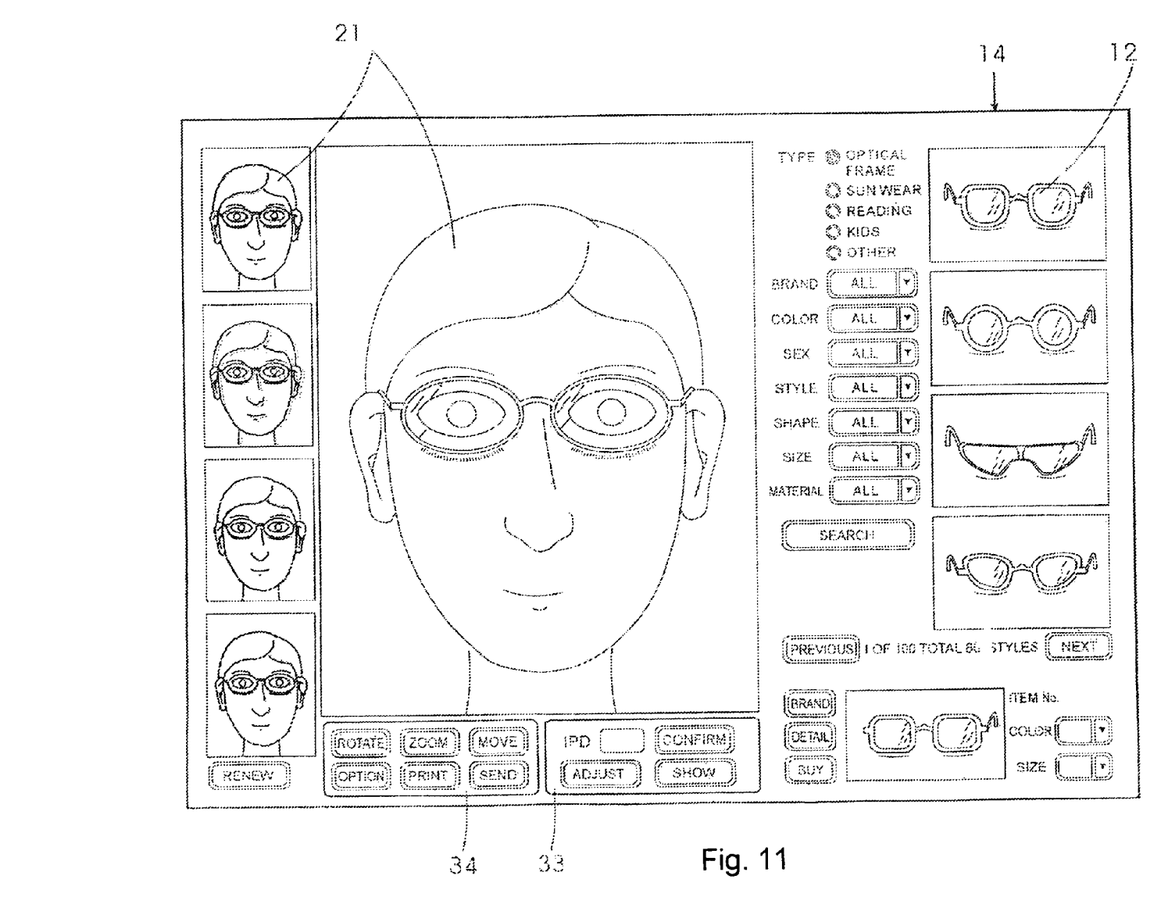
FIG. 11 shows the third step of pasting-over by superimposition of digital frame image over the facial image and pasting back the cropped ear portion, in accordance with the disclosure of present invention.
Figure 12:
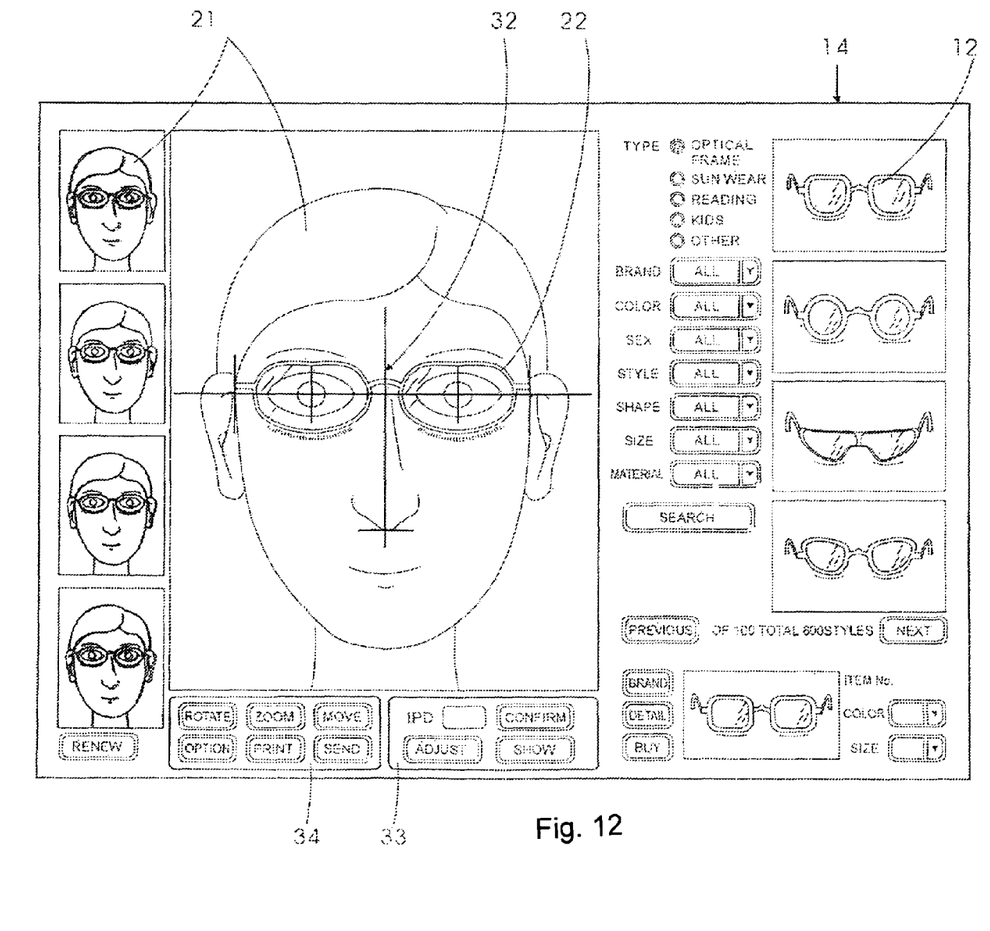
FIG. 12 shows the displayed result having a user wearing spectacle frame with benchmark ruler superimposed over on top, in accordance with the disclosure of present invention.

The third step is putting back the cropped away ear (partial) image back to facial image 21, showing the result of a face wearing a spectacle frame.

The crop-away partial image may also include objects that can be seen covering some part of the ears, such as hair, caps or other jewelry items.

A common technique, dulling, is used to enhance the "real world" sense of test-fitting when spectacle frame legs are inserted into hair or behind ears, as is available in the popular graphics tool PhotoShops.

Alternatively, the crop-block 323 covering a consumer's ear can be used as the benchmark ruler, for use in conjunction with paste-over device 30, allowing user to operate the benchmark ruler in this fashion.

Since computer is taking care of the calculation in the paste-over, the digital frame image 12 can be pasted anywhere on the facial image 21, or along the horizontal measurement line 322, which is normally set to coincide with the line connecting the two pupils of a consumer's face.

Figure 2:
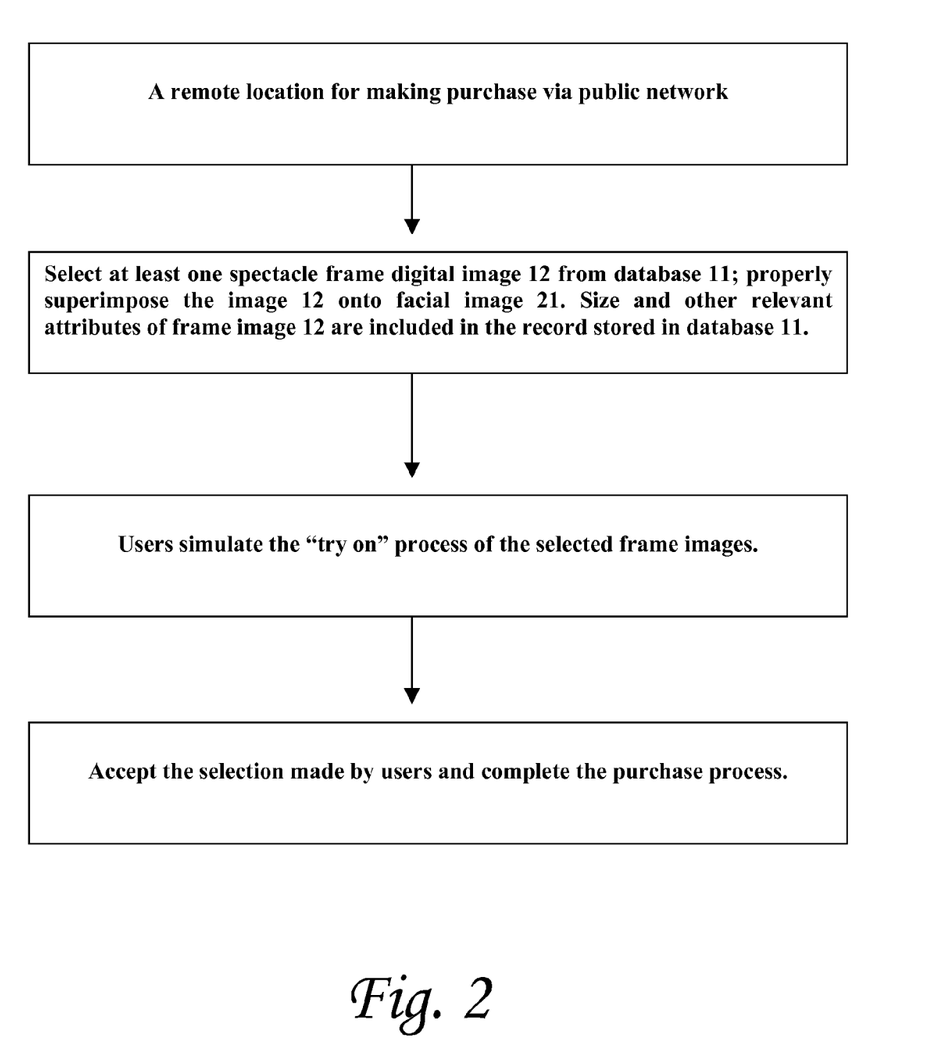
FIG. 2 shows the flow chart of optical products buying process over the public network in accordance with the disclosure of present invention.

The optical products buying process, in accordance with the infra-structure disclosed herein, will greatly promote the customer acceptance to the goods sold this way, since the selling and trying-on process is made easier. A further use of present method includes turning customers into members of a buying club for remotely stored goods and allowing member information database 15 to pre-store customer info, so that the purchasing process is further streamlined, due to the available of spectacle frame information in database 11 and customer database 15 and the ease of advertisement and user feedback.

For people reasonably skilled in the art and who follow the teachings and the substance of present invention, it is understood that the embodiments disclosed herein are meant as illustration and not as limitation to the scope. The method as taught herein can be varied, in accordance with the teaching, and still present the claimed advantages and functionality and certainly are part of the scope of present invention.

What is claimed is:

1. A method for database-driven stored-image spectacle frame fitting services over public network, comprising the steps of:
   (a) Produce the frontal view of spectacle frames having open frame legs and derive the digital image of said frontal view after the background and the optical lens are made transparent;
   (b) Enter the vertical height, horizontal length, central point as marked by vertical and horizontal lines, and other relevant attributes of said digital images when they are stored into computer databases; and,
   (c) Set up a calibration paste-over device containing a benchmark ruler having a crop-box on the two horizontal sides of said ruler whereby said benchmark ruler allows two marking points to be selected as reference points relative to facial images when displayed.

2. The method in claim 1, wherein the relevant attributes of databases of frame product images include the center point of selected spectacle frame is displayed as the cross point of a vertical line and a horizontal line running the full height and full length of the spectacle image.

3. The method in claim 1, wherein crescent-shaped reflective color effect is added to the opposite and corresponding spots on the two lenses, or the area on the spectacle frame defining two lenses and color-fading effects are applied, resulting the desired effect of light-reflection as can be perceived similar to real life situation.

4. The method in claim 1, wherein the lower portion or the underside of the spectacle frame image is further superimposed with shade-lines and shades of gray, to enhance the effect of shading as can be perceived similar to real life situation.

5. The method in claim 1, wherein said facial image includes size parameter chosen as the pupil distance on a facial image when the benchmark ruler is placed horizontally and through the line connecting the two pupils on the facial image.

6. The method in claim 1, wherein said facial image includes size parameter chosen as actual distance of two selected points on a facial image along the length of benchmark ruler, whether the ruler is placed horizontally or vertically.

7. The method in claim 1, wherein a ruler is attached to a user's face when said facial image is being acquired, showing the actual size of user's face as a result of such use of ruler.

8. The method in claim 1, wherein said facial image includes size parameter of the horizontal length or vertical height of a spectacle frame as worn by the person whose image is being acquired.

9. The method in claim 1, wherein the benchmark ruler placed on the facial image can be moved, dragged, expanded or contracted when displayed over a facial image on a display device, along with the selected spectacle frames image.

10. The method in claim 1, wherein the a paste-over involves the steps of:
   a. cut out the ear portion from the facial image, according to the defined shape of a crop-block.
   b. paste-over the digital image of a selected spectacle frame over the face, including the cropped out ear portion.
   c. put back the cropped away ear portion image back to facial image, showing the result of a face wearing a spectacle frame.

11. A mechanism for choosing and test-fitting spectacle frame over public network, comprising:
   a. A choice center containing a computer database of stored images for spectacle frames, the display device is accessible over public network and contains great selections of digital images of spectacle frames;
   b. A transmission platform and display device connected to above-said computer database via communication protocol, wherein users may transmit facial images from said platform and have the images shown on the display device; and,
   c. A calibration paste-over device that includes a benchmark ruler on the display device and that said benchmark ruler contains two marking points that can be used as the alignment/matching reference points relative to facial images when displayed, and said benchmark ruler can be moved, dragged, expanded and contracted, relative to the facial image, so that the marking points can be set to superimposed upon selected marking points (such as centers of pupils) on facial images, resulting in the correct size calculation of face relative to the stored images of the spectacle frames, based upon the attributes of height and width of spectacle frames that have been pre-loaded into database, and said calibration paste-over device contains a crop-block set to mimic the border facial silhouette line abutting the ear portion, so that a consumer's ear portion on the image can be cut out in the first step of paste-over according to the defined shape of said crop-block, and, in the second step, paste-over the digital frame image over the face, including the cropped out ear portion, and the third step is putting back the cropped away ear (partial) image back to facial image, showing the result of a face wearing a spectacle frame.

* * * * *